United States Patent [19]

Schilling

[11] Patent Number: 5,166,951
[45] Date of Patent: Nov. 24, 1992

[54] HIGH CAPACITY SPREAD SPECTRUM CHANNEL

[75] Inventor: Donald L. Schilling, Sands Point, N.Y.

[73] Assignee: SCS Mobilecom, Inc., Port Washington, N.Y.

[21] Appl. No.: 699,614

[22] Filed: May 15, 1991

[51] Int. Cl.⁵ .................... H04K 1/00; H04L 27/10
[52] U.S. Cl. ...................................................... 375/1
[58] Field of Search ............................................ 375/1

[56] References Cited

U.S. PATENT DOCUMENTS

| | | |
|---|---|---|
| 3,831,013 | 8/1974 | Alsup et al. . |
| 3,900,721 | 8/1975 | Speiser et al. . |
| 4,112,372 | 9/1978 | Holmes et al. . |
| 4,222,115 | 9/1980 | Cooper et al. . |
| 4,238,850 | 12/1980 | Vance . |
| 4,247,942 | 1/1981 | Hauer . |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 1/1984 | Moses et al. . |
| 4,455,651 | 6/1984 | Baran . |
| 4,479,226 | 10/1984 | Prabhu et al. . |
| 4,512,013 | 4/1985 | Nash et al. . |
| 4,523,311 | 6/1985 | Lee et al. . |
| 4,553,130 | 11/1985 | Kato . |
| 4,563,774 | 1/1986 | Gloge . |
| 4,606,039 | 8/1986 | Nicholas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibewitz . |
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr .......................... 375/1 |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,755,983 | 7/1988 | Masak et al. ............... 375/1 |
| 4,759,034 | 7/1988 | Nagazumi . |
| 4,789,983 | 12/1988 | Acampora et al. . |
| 4,799,253 | 1/1989 | Stern et al. . |
| 4,805,208 | 2/1989 | Schwartz . |

(List continued on next page.)

Primary Examiner—Salvatore Sangialosi
Attorney, Agent, or Firm—David Newman & Associates

[57] ABSTRACT

A high-capacity-spread-spectrum transmitter and receiver, for use over a communications channel. A demultiplexer demultiplexes message data into a plurality of demultiplexed-data signals. A transmitter-generic-chip-code generator generates a generic-chip-code signal and a plurality of transmitter-message-chip-code generators generate a plurality of message-chip-code signals which are "near-orthogonal" over a demultiplexed data bit. A plurality of EXCLUSIVE-OR gates, spread-spectrum processes the plurality of demultiplexed-data signals with the plurality of message-chip-code signals to generate a plurality of spread-spectrum signals. A combiner combines the generic-chip-code signal and the plurality of spread-spectrum-processed signals. A receiver-generic-chip-code generator generates a replica of the generic-chip-code signal. A generic mixer recovers the carrier signal from the spread-spectrum-communications signal. A plurality of receiver-message-chip-code generators generate a plurality of replicas of the message-chip-code signals. A plurality of message mixers despreads the spread-spectrum-communications signal as a plurality of modulated-data signals. Tracking and acquisition circuits use the recovered carrier signal for synchronizing the replicas of the generic-chip-code signal to the recovered carrier signal. A plurality of envelope detectors demodulates the modulated-data signal as a plurality of received-demultiplexed data. A multiplexer multiplexes the plurality of received-multiplexed data as received data.

26 Claims, 6 Drawing Sheets

U.S. PATENT DOCUMENTS

| | | |
|---|---|---|
| 4,807,222 | 2/1989 | Amitay . |
| 4,837,802 | 6/1989 | Higashiyama et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. ............ 375/1 |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. . |

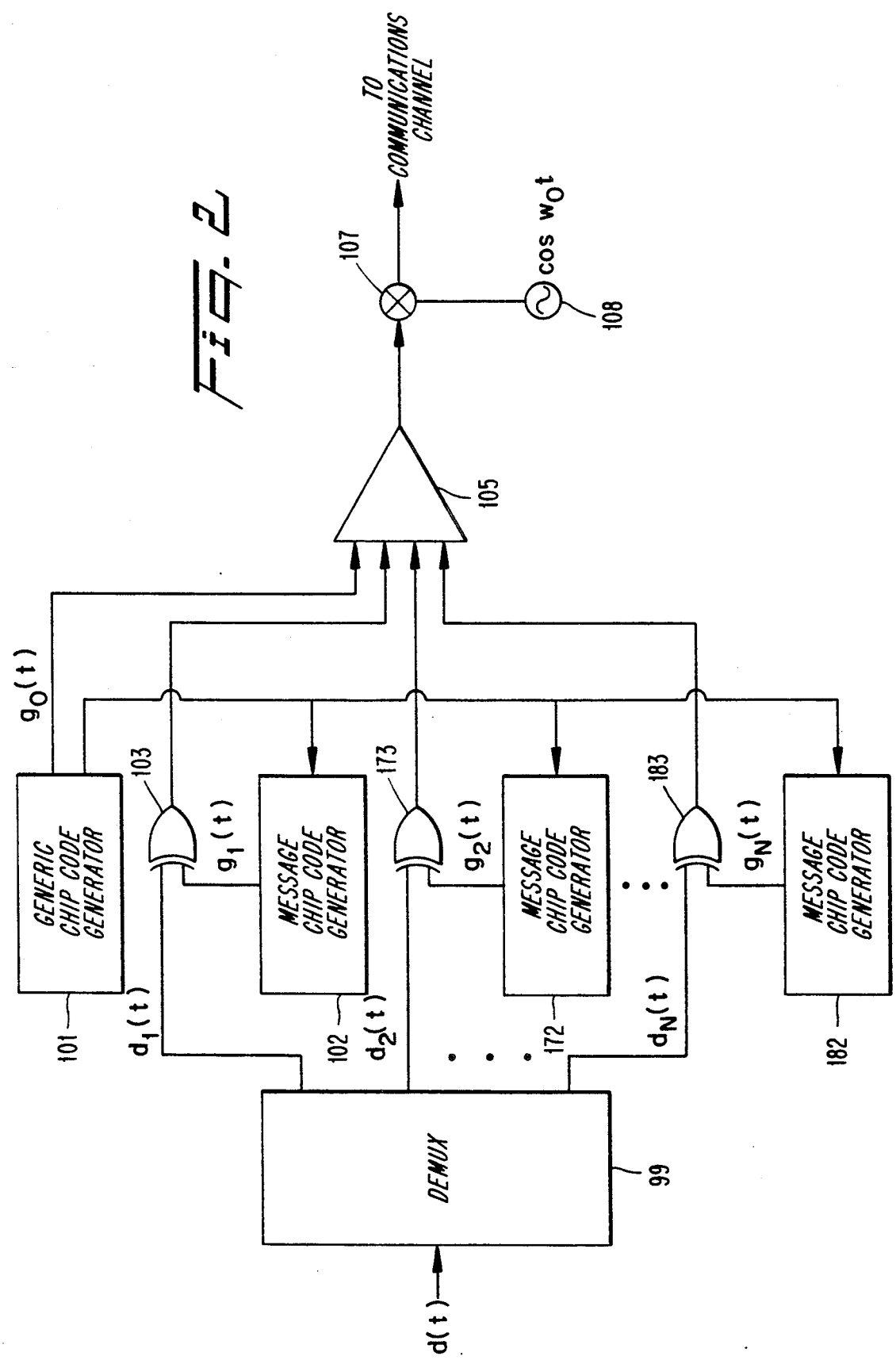

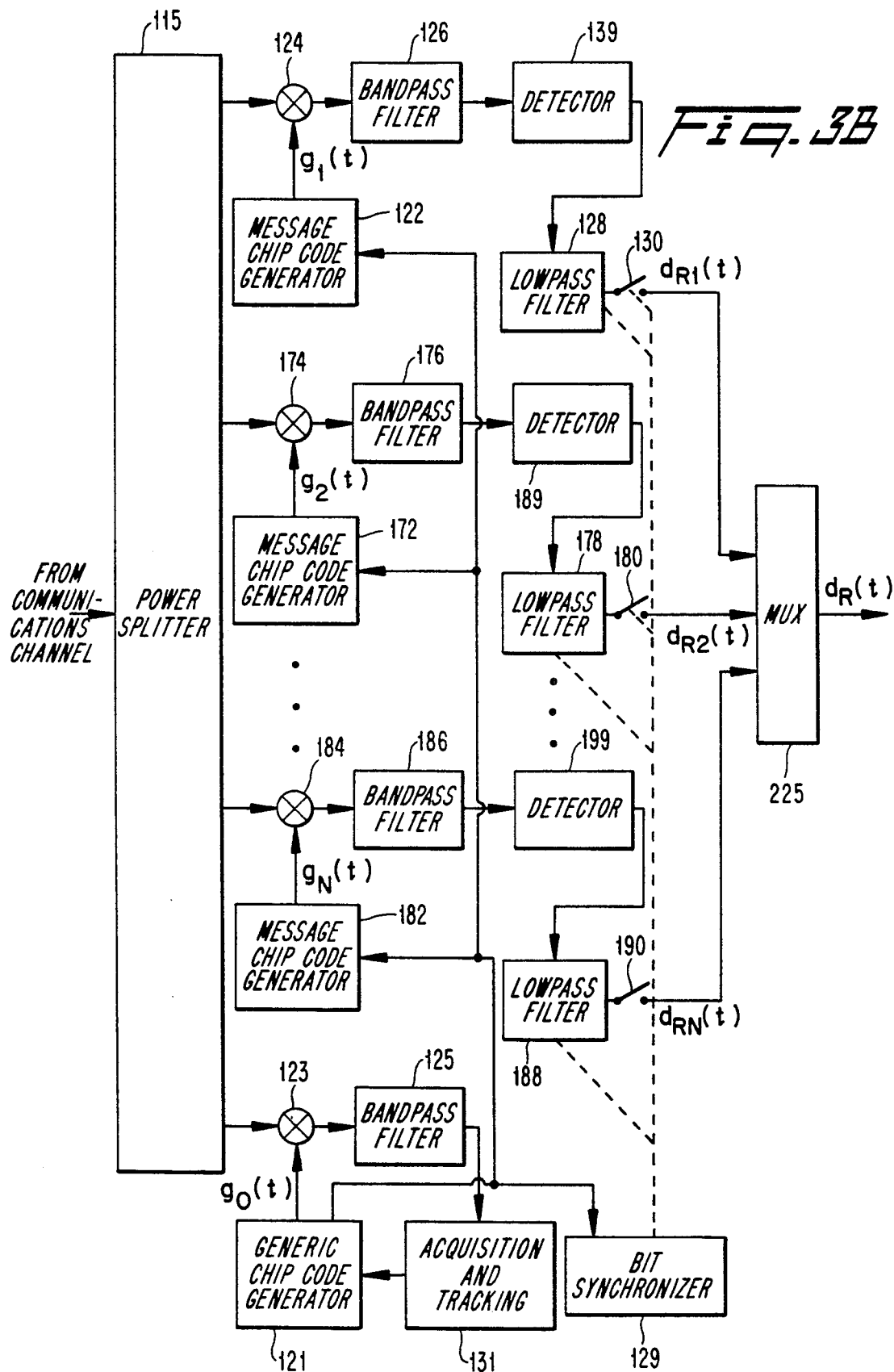

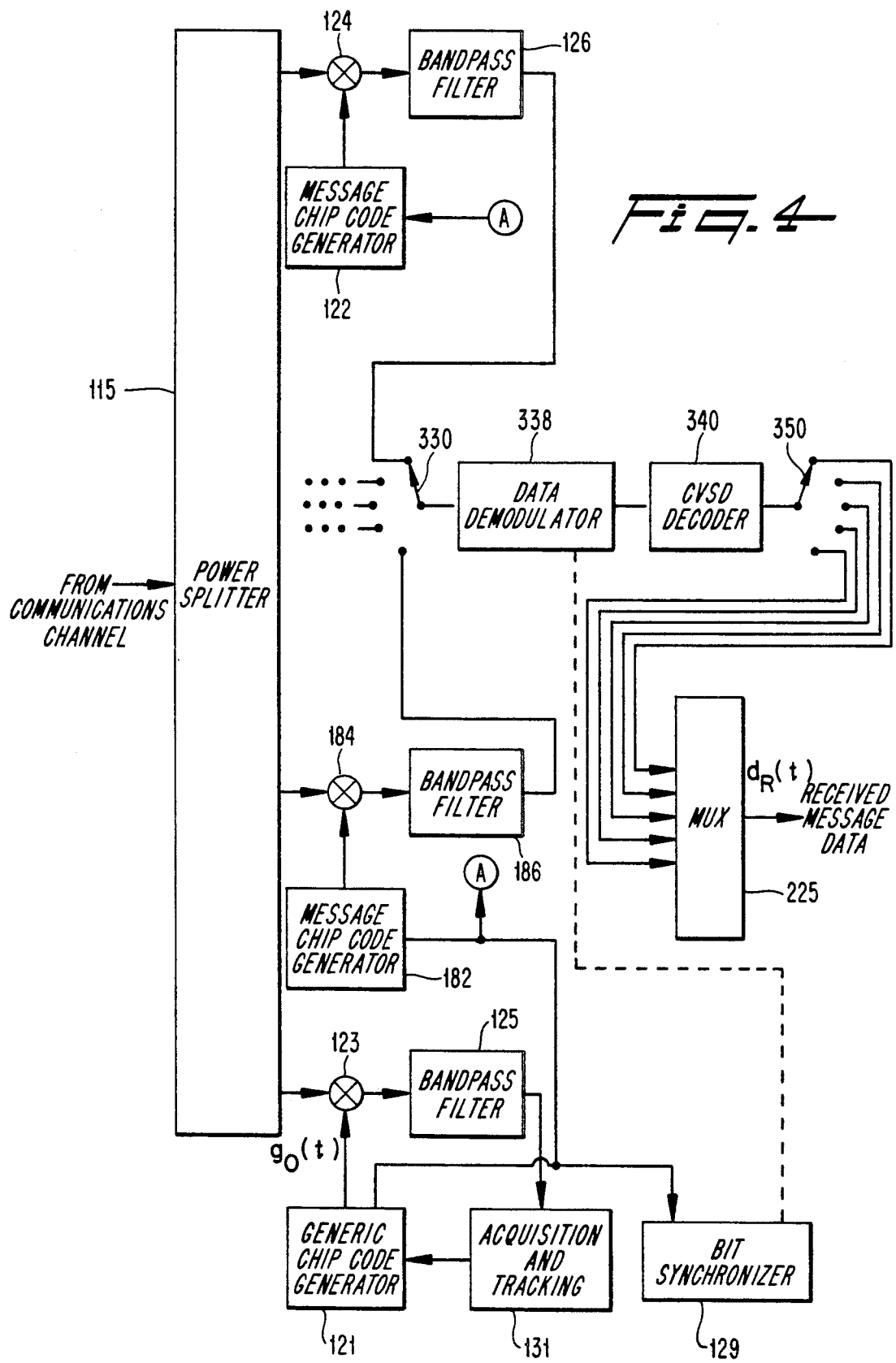

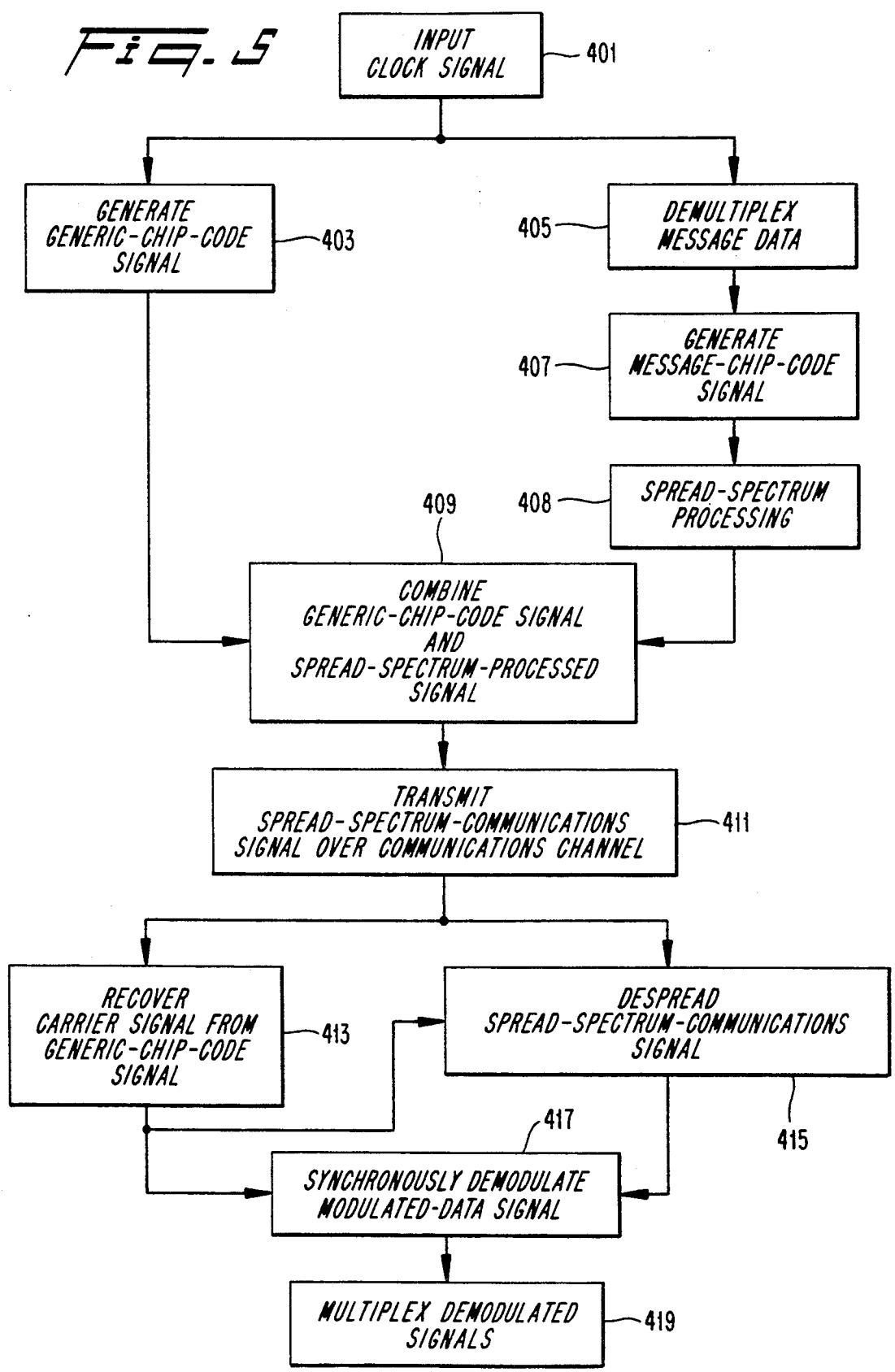

HIGH CAPACITY SPREAD SPECTRUM CHANNEL

BACKGROUND OF THE INVENTION

This invention relates to spread-spectrum communications and more particularly to a system and method for a high capacity spread-spectrum communications channel.

DESCRIPTION OF THE PRIOR ART

Referring to FIG. 1, message data, d(t), are processed by spread-spectrum data modulator 51, using a message-chip-code signal, $g_1(t)$, to generate a spread-spectrum data signal. The data spread-spectrum signal is processed by transmitter 52 using a carrier signal at a carrier frequency, $f_o$, and transmitted over communications channel 53.

At a receiver, a spread-spectrum demodulator 54 despreads the received spread-spectrum signal, and the message data are recovered by synchronous data demodulator 60 as received data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is also adequate.

The spread-spectrum system of FIG. 1 is limited to a single communications channel, and would not work well for communicating high capacity information using spread-spectrum in a fading environment. Consider the T1, Ethernet, and T3 networks, by way of example, and assume the data modulator 51 spread-spectrum processes the message data, d(t), with a chip rate of 25 megachips per second. For the T1 network which communicates data at up to 1.544 megabits per second, the spread-spectrum system of FIG. 1 has a processing gain of approximately 17. For the Ethernet, which communicates data at up to 10 megabits per second, the spread-spectrum system of FIG. 1 has a processing gain of 2.5. For the T3 network, which communicates data at up to 43 megabits per second, the spread-spectrum system of FIG. 1 has a processing gain of approximately 0.6. Thus, for a particular spread-spectrum channel, data communicated at a higher rate results in a lower processing gain. The lower processing gain can result in channel degradation and loss of the advantages of spread-spectrum. For example: resistance to fading caused by multipath and inability to share the spectrum with other spread spectrum systems such as a PCN system.

Information may be transmitted through the spread-spectrum channel by using M-ary modulation schemes, such as quadrature phase-shift-keying (QPSK) modulation or 16-ary amplitude and phase modulation, for increasing the data rate through the channel. The M-ary modulation schemes are modulated with spread spectrum. Problems with M-ary modulation schemes include increased equipment complexity for the transmitter and receiver, and higher error rates because the decision regions between symbols, such as phase angles or amplitude levels, for example, become closer. Using M-ary signaling schemes, accordingly, can cause degradation in channel performance. Thus, a need exists for a system and method that provides a high capacity spread-spectrum channel, which does not have increased equipment complexity, a degradation in performance, or loss of the advantages of spread-spectrum modulation.

Today, high data rate transmission employs 64QAM without spread spectrum. These systems are extremely sensitive to noise since the separation of symbols is small. They therefore require a high signal-to-noise ratio. Hence, all interference must be small. This limits their capability to efficiently use the spectrum.

OBJECTS OF THE INVENTION

A general object of the invention is a synchronous, high-capacity, spread-spectrum-communications system.

Another object of the invention is a system and method for communicating information at a high rate through a spread-spectrum channel, while maintaining the advantages of spread-spectrum including high processing gain, resistance to fading and an ability to share the same spectrum with other users.

A further object of the invention is to synchronously demodulate a plurality of modulated-data signals embedded in a spread-spectrum-communications signal.

SUMMARY OF THE INVENTION

According to the present invention, as embodied and broadly described herein, a high capacity spread spectrum communications system for use over a communications channel is provided comprising a high-capacity-spread-spectrum transmitter and a high-capacity-spread-spectrum receiver. The high-capacity-spread-spectrum transmitter includes demultiplexer means, generic means, a plurality of message means, summer means, and transmitter means. The demultiplexer means demultiplexes the message data into a plurality of demultiplexed-data signals. The generic means generates a generic-chip-code signal. The plurality of message means generates a plurality of message-chip-code signals. Each of the plurality of demultiplexed-data signals and each of the plurality of message-chip-code signals are synchronized to each other and optionally to the generic-chip-code signal. The message-chip-code signals must be orthogonal or near orthogonal for the high-capacity-spread-spectrum system to work.

Each spreading means of the plurality of spreading means, spread-spectrum processes a demultiplexed-data signal with a respective message-chip-code signal to generate a spread-spectrum-processed signal. The summer means combines the plurality of spread-spectrum-processed signals, and if used, the generic-chip-code signal. The combined signal typically is a multi-level signal, with an instantaneous-combined voltage level equal to the sum of the voltage levels of the plurality of message-chip-code signals and, if used, the generic-chip-code signal. A multi-level signal is a signal with multiple voltage levels.

The transmitter means transmits the combined plurality of spread-spectrum-processed signals, and if used, the generic-chip-code signal, on a carrier signal over the communications channel as a spread-spectrum-communications signal. While the transmitter means may use a linear power amplifier for optimum performance, a nonlinear power amplifier also may be used without significant degradation or loss in performance. Thus, the sum of voltage levels need not be an exact linear sum, with only a little loss in performance.

The high-capacity-spread-spectrum receiver can be used for simultaneously receiving a plurality of spread-spectrum channels of a spread-spectrum-communications signal. The high-capacity-spread-spectrum receiver includes acquisition and tracking means, multiplexer means, and a plurality of spread-spectrum receivers, and optionally generic-spread-spectrum-processing means. Each spread-spectrum receiver includes message-spread-spectrum-processing means, detection means and bit-synchronization means.

The generic-spread-spectrum-processing means, if used, recovers a carrier signal from a spread-spectrum channel of a received spread-spectrum-communications signal, and generates a replica of the generic-chip-code signal. The acquisition and tracking means acquires and tracks the recovered carrier signal. The acquisition and tracking means also synchronizes the generic-spread-spectrum-processing means to the recovered carrier signal.

The generic-spread-spectrum-processing means is not required for the high-capacity-spread-spectrum receiver. The acquisition and tracking means may be coupled to an output of a message-bandpass filter, and appropriate circuitry, such as that shown in FIG. 1, can be used to recover the carrier signal.

The plurality of message-spread-spectrum-processing means despreads the received spread-spectrum-communications signal as a plurality of modulated-data signals. The plurality of message-spread-spectrum-processing means derives synchronization from one of the modulated-data signals, or a replica of the generic-chip-code signal provided by generic-spread-spectrum-processing means.

The plurality of detection means detects the plurality of modulated-data signals as a plurality of detected signals, respectively. The plurality of detection means may be nonsynchronous or synchronous, for converting the plurality of modulated-data signals to the plurality of detected signals, respectively.

The bit-synchronization means uses one of the modulated data signals or the replica of the generic-chip-code signal produced by the generic-spread-spectrum-processing means for synchronizing the "integrating and dumping" of the detected signal. The "integrated and dumped" detected signals are referred to as demodulated signals. The multiplexer means multiplexes the plurality of demodulated signals from the plurality of bit-synchronization means as received-message data.

A second embodiment of the high-capacity-spread-spectrum receiver for simultaneously receiving a plurality of spread-spectrum channels includes acquisition and tracking means, multiplexer means, and a plurality of spread-spectrum receivers, demodulation means, switching means, and optionally generic-spread-spectrum-processing means. Each of the plurality of spread-spectrum receivers has message-spread-spectrum-processing means. The generic-spread-spectrum-processing means, if used, generates a replica of the generic-chip-code signal. The generic-spread-spectrum-processing means uses the replica of the generic-chip-code signal for recovering a carrier signal from a spread-spectrum channel of the received spread-spectrum-communications signal. The acquisition and tracking means acquires and tracks the recovered carrier signal, and synchronizes the generic-spread-spectrum-processing means to the recovered carrier signal. Alternatively, a demodulated data signal from the spread-spectrum-communications signal can serve for synchronization.

Each of the message-spread-spectrum-processing means despreads the respective spread-spectrum channel of the received spread-spectrum-communications signal as a modulated-data signal. Each of the message-spread-spectrum-processing means derives synchronization from a replica of the generic-chip-code signal provided by the generic-spread-spectrum-processing means, or one of the demodulated-data signals from the received spread-spectrum-communications signal.

A single demodulating means is employed for demodulating each modulated-data signal as a respective demodulated signal. The demodulation means includes detection means and bit-synchronization means. The demodulation means is used on a time-shared basis. Accordingly, the detection means sequentially detects each of the plurality of modulated-data signals from the plurality of message-spread-spectrum-processing means, as a detected signal. The detection means may be nonsynchronous or synchronous, for converting each of the plurality of modulated-data signals to a detected signal. Each of the detected signals is "integrated and dumped" by bit-synchronization means. The bit-synchronization means derives synchronization from a replica of the generic-chip-code signal produced by generic-spread-spectrum-processing means.

Switching means is coupled between an input of the demodulation means and each output of the message-spread-spectrum-processing means. The switching means also is coupled between the output of the demodulation means and a plurality of inputs of the multiplexer means. The switching means switches the demodulation means between each of the message-spread-spectrum-processing means and each input of the multiplexer means, respectively. A single demodulation means accordingly demodulates, by time sharing, each of the modulated-data signals as a respective demodulated signal, from each of the message-spread-spectrum-processing means. The multiplexer means, by time-sharing the demodulation means, combines each of the demodulated signals from the demodulation means to generate the received-message data.

The present invention also includes a method for synchronously modulating and demodulating spread spectrum communications. The method comprises the steps of generating a generic-chip-code signal and a plurality of message-chip-code signals. The message data are demultiplexed into a plurality of demultiplexed-data signals. Each of the plurality of demultiplexed-data signals are modulo-2 added to a message-chip-code signal to generate a spread-spectrum-processed signal. The generic-chip-code signal and the plurality of spread-spectrum-processed signals are combined and transmitted on a carrier signal over the communications channel as a spread-spectrum-communications signal.

At the receiver, the steps include recovering the carrier signal from a received spread-spectrum-communications signal and despreading the received spread-spectrum communications signal as a plurality of modulated-data signals. The recovered-carrier signal is used to synchronize the step of generating a replica of the generic-chip-code signal, or other synchronization signal. More particularly, a replica of the generic-chip-code signal is correlated with the received spread-spectrum-communications signal, which has a generic channel defined by the generic-chip-code signal at the transmitter. If the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

A plurality of replicas of the message-chip-code signals is synchronized to the replica of the generic-chip-code signal for despreading the received spread-spectrum-communications signals as a plurality of modulated-data signals. The plurality of modulated-data signals is detected as a plurality of detected signals. The recovered-carrier signal optionally may be used to synchronously demodulate the plurality of modulated-data signals as the plurality of detected signals. Each of the detected signals is synchronously converted to a demodulated signal, by using timing from the replica of the generic-chip-code signal to control "integrating and dumping" functions of a lowpass filter and electronic switch. The plurality of demodulated signals is multiplexed to generate the received message-data signal.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 2 shows a synchronous high-capacity-spread-spectrum transmitter;

FIG. 3B illustrates a high-capacity-spread-spectrum receiver using a nonsynchronous detector;

FIG. 4 shows a high-capacity-spread-spectrum receiver with time multiplexing a data demodulator and decoder; and FIG. 5 is a diagram of a high-capacity spread spectrum method of the present invention.

DETAILED DESCRIPTION OF THE PREFERRED EMBODIMENTS

Figure 1:
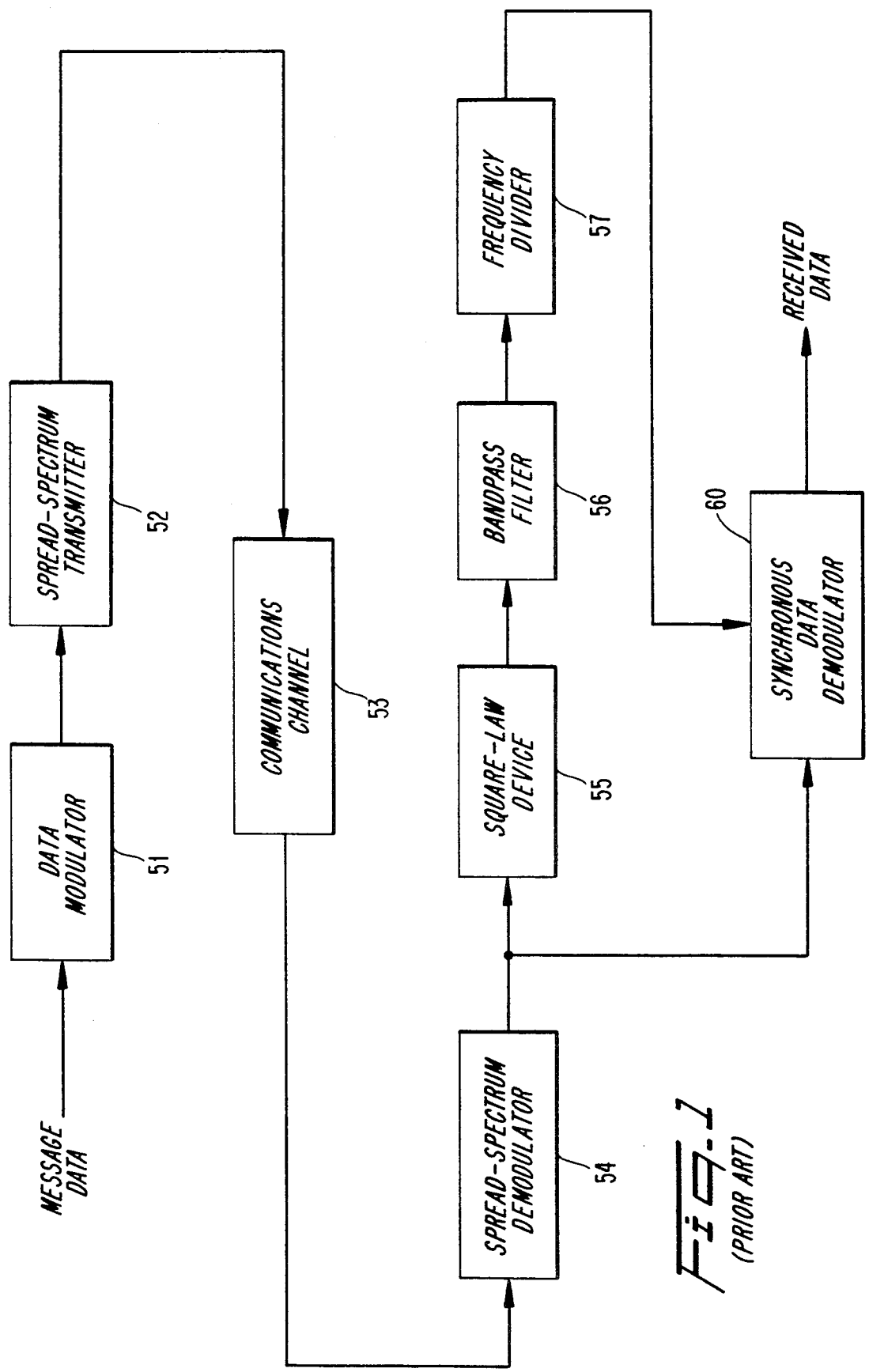
FIG. 1 is a prior art scheme for synchronously recovering demultiplexed-data signal.

Reference will now be made in detail to the present preferred embodiments of the invention, examples of which are illustrated in the accompanying drawings, wherein like reference numerals indicate like elements throughout the several views.

This patent is related to U.S. patent application having Ser. No. 07/622,235, filing date Dec. 5, 1990, entitled SPREAD SPECTRUM CDMA COMMUNICATIONS SYSTEM by Donald L. Schilling, and to U.S. patent application having Ser. No. 07/626,109, filing date Dec. 14, 1990, entitled SYNCHRONOUS SPREAD-SPECTRUM COMMUNICATIONS SYSTEM AND METHOD, which are both incorporated herein by reference.

The following disclosure first discusses a high-capacity-spread-spectrum transmitter, and then two embodiments of a high-capacity-spread-spectrum receiver. Broadly, this disclosure teaches apparatus and method for sending message data, which may have a data rate which is greater than the spread-spectrum chip rate, over the spread-spectrum communications system while maintaining a specified processing gain.

The high-capacity-spread-spectrum transmitter includes demultiplexer means, a plurality of message means, summer means, and transmitter means. The demultiplexer means demultiplexes the message data into a plurality of demultiplexed-data signals.

The plurality of message means generates a plurality of message-chip-code signals. Each of the plurality of demultiplexed-data signals and each of the plurality of message-chip-code signals are synchronized to each other. Synchronization between each of the plurality of message-chip-code signals and each of the plurality of demultiplexed-data signals is preserved by their common timing and reception at the high-capacity-spread-spectrum receiver. Each spreading means of the plurality of spreading means spread-spectrum processes a demultiplexed-data signal with the respective message-chip-code signal to generate a spread-spectrum-processed signal.

The high-capacity-spread-spectrum transmitter optionally may include generic means. The generic means generates a generic-chip-code signal. If generic means is used, then each of the plurality of demultiplexed-data signals and each of the plurality of message-chip-code signals are synchronized to the generic-chip-code signal. Synchronizing to a generic-chip-code signal is not required for the high-capacity-spread-spectrum transmitter since the plurality of message-chip-code signals and the plurality of demultiplexed-data signals are synchronized to each other, and they all form the spread-spectrum-communications signal which is received by the high-capacity-spread-spectrum receiver.

The summer means combines the plurality of spread-spectrum-processed signals. If a generic-chip-code signal is used then the summer means also combines the generic-chip-code signal with the plurality of spread-spectrum-processed signals. The combined signal typically is a multi-level signal, with the instantaneous-combined voltage level equal to the sum of the voltage levels of the plurality of message-chip-code signals and the generic-chip-code signal. A multi-level signal is defined herein as a signal which has multiple voltage levels. The combination need not be perfectly linear.

The following disclosure is in terms of the generic means and using the generic-chip-code signal for synchronization. It is understood that the generic-chip-code signal is not required for the high-capacity-spread-spectrum transmitter and high-capacity-spread-spectrum receiver, since the plurality of demultiplexed-data signals and message-chip-code signals are synchronized to each other and they all form the spread-spectrum-communications signal. Thus, one of the channels of the spread-spectrum-communications signal can be used for a synchronization signal. The reference to the generic-chip-code signal could instead be referring to one of the channels having a demultiplexed-data signal.

The transmitter means transmits the combined generic-chip-code signal and plurality of spread-spectrum-processed signals, on a carrier signal over the communications channel as spread-spectrum-communications signal.

In the exemplary arrangement shown in FIG. 2, the demultiplexer means is embodied as a demultiplexer 99, the plurality of message means is embodied as a plurality of transmitter-message-chip-code generators, the plurality of spreading means is embodied as a plurality of EXCLUSIVE-OR gates, and the generic means is embodied as a transmitter-generic-chip-code generator 101. The plurality of transmitter-message-chip-code generators generates a plurality of message-chip-code signals, respectively. In FIG. 2, the plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The number, N, of message-chip-code signals depends on the length of the chip code used with the message-chip-code signal and the specified or desired processing gain.

Each of the plurality of message-chip-code signals are preferably orthogonal or nearly orthogonal for the high-capacity-spread-spectrum system to work. Otherwise, there is no processing gain. Consider a T1 channel which is demultiplexed to 1.5 Mbps and 30 message-chip-code signals are used with 30 demultiplexed-data-signals. For a 48 MHz bandwidth spread-spectrum-communications signal, a processing gain of only approximately 17 is realized. This means, ordinarily, that the high-capacity-spread-spectrum system can handle only 17 and not 30 spread-spectrum processed signals. Since all the demultiplexed-data signals are transmitted in synchronization with one another, orthogonal spreading chip codes or near-orthogonal spreading chip-codes can be used to increase performance. The resulting performance is from despreading one of the spread-spectrum channels, and the other channels cancel out. Using orthogonal message-chip-code signals allows the high-capacity-spread-spectrum system to handle 30 spread-spectrum-processed signals since:

$$\int_0^{T_b} d_i(t)g_i(t)g_j(t)\, dt = d_i(t)T_b \text{ for } i = j$$

0 for $i \neq j$.

The demultiplexer 99 demultiplexes message data, d(t), into a plurality of demultiplexed-data signals, $d_1(t)$, $d_2(t)$, ..., $d_N(t)$, respectively. Appropriate buffers, such as shift registers, can be used to buffer the message data from serial data to parallel data as required.

The transmitter-generic-chip-code generator 101 generates a generic-chip-code signal, $g_0(t)$. The transmitter-generic-chip-code generator 101, if used, is coupled to each of the plurality of transmitter-message-chip-code generators. Thus, the transmitter-generic-chip-code generator 101 is coupled to the first transmitter-message-chip-code generator 102, the second transmitter-message-chip-code generator 172, through the $N^{th}$ transmitter-message-chip-code generator 182. The generic-chip-code signal, $g_0(t)$, is used with the plurality of demultiplexed-data signals, $d_1(t)$, $d_2(t)$, ..., $d_N(t)$.

If the transmitter-generic-chip-code generator 101 is not used, then appropriate timing circuits would be coupled to each of the plurality of transmitter-message-chip-code generators.

The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of demultiplexed-data signals, $d_1(t)$, $d_2(t)$, ..., $d_N(t)$, with each of the plurality of message-chip-code signals $g_1(t)$, $g_2(t)$, ..., $g_N(t)$, respectively. More particularly, a first demultiplexed-data signal, $d_1(t)$, is modulo-2 added with the first message-chip-code signal, $g_1(t)$, a second demultiplexed-data signal, $d_2(t)$, is modulo-2 added with the second message-chip-code signal, $g_2(t)$, through the $N^{th}$ demultiplexed-data signal, $d_N(t)$, which is modulo-2 added with the $N^{th}$ message-chip-code signal, $g_N(t)$. Preferred performance is attained if the message-chip-code signals are orthogonal or nearly orthogonal to each other. By nearly orthogonal is meant that the message-chip-code signals are orthogonal within a few chips, usually one chip, duration. The term "orthogonal" is used in this specification and claims to include orthogonal and nearly orthogonal message-chip-code signals.

The combiner 105 combines the generic-chip-code signal and the plurality of spread-spectrum-processed signals, by adding the generic-chip-code signal with the plurality of spread-spectrum-processed signals. The combined signal typically is a multilevel signal, having instantaneous voltage levels which are equal to the sum of the voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos w_0 t$, at a carrier frequency, $f_o$. The modulated generic-chip-code signal and the plurality of spread-spectrum processed signals are transmitted over the communications channel as a spread-spectrum-communications signal, $x_c(t)$, at a single carrier frequency. While the transmitter may use a linear power amplifier for optimum performance, a nonlinear power amplifier also may be used without significant degradation or loss in performance. The spread-spectrum-communications signal, $x_c(t)$, has the form:

$$x_c(t) = \left\{ g_0(t) \oplus \sum_{i=1}^{N} [g_i(t) \oplus d_i(t)] \right\} \cos w_0 t$$

Thus, the spread-spectrum-communications signal includes the generic-chip-code signal and the plurality of spread-spectrum-processed signals as if they were each modulated separately, and synchronously, on separate carrier signals, with each carrier signal having the same carrier frequency, $f_o$. The spread-spectrum-communications signal is transmitted over the communications channel.

If the generic-chip-code signal is not transmitted with the spread-spectrum-communications signal, then the spread-spectrum-communications signal, $x_c(t)$, has the form:

$$x_c(t) = \left\{ \sum_{i=1}^{N} [g_i(t) \oplus d_i(t)] \right\} \cos w_0 t$$

The present invention includes receiving a received spread-spectrum-communications signal having a plurality of spread-spectrum-processed signals. The plurality of spread-spectrum-processed signals originate from a high-capacity-spread-spectrum transmitter. The high-capacity-spread-spectrum receiver multiplexes the plurality of spread-spectrum channels of the received spread-spectrum-communications signal as received-message data.

A first implementation of the high-capacity-spread-spectrum receiver includes generic-spread-spectrum-processing means, acquisition and tracking means, a plurality of spread-spectrum receivers and multiplexer means. Each of the spread-spectrum receivers has message-spread-spectrum-processing means, detection means and bit-synchronization means.

The generic-spread-spectrum-processing means, if used, recovers a carrier signal from a generic-spread-spectrum channel of a received spread-spectrum-communications signal. The acquisition and tracking means acquires and tracks the recovered carrier signal. The acquisition and tracking means also synchronizes the generic-spread-spectrum-processing means to the recovered carrier signal. As illustratively shown in FIGS. 3A and 3B, the generic-spread-spectrum-processing means is embodied as a receiver-generic-chip-code generator 121, a generic mixer 123 and a generic-bandpass filter 125. The generic mixer 123 is coupled between the receiver-generic-chip-code generator 121 and the generic-bandpass filter 125.

If a generic-chip-code signal is not part of the received spread-spectrum-communications signal, then the generic-spread-spectrum-processing means may alternatively recover the carrier signal from one of the modulated-data signals demodulated from the received spread-spectrum-communications signal.

The plurality of message-spread-spectrum-processing means despreads the received spread-spectrum-communications signal as a plurality of modulated-data signals. The plurality of message-spread-spectrum-processing means derives synchronization from a replica of the generic-chip-code signal provided by the generic-spread-spectrum-processing means.

Figure 3A:
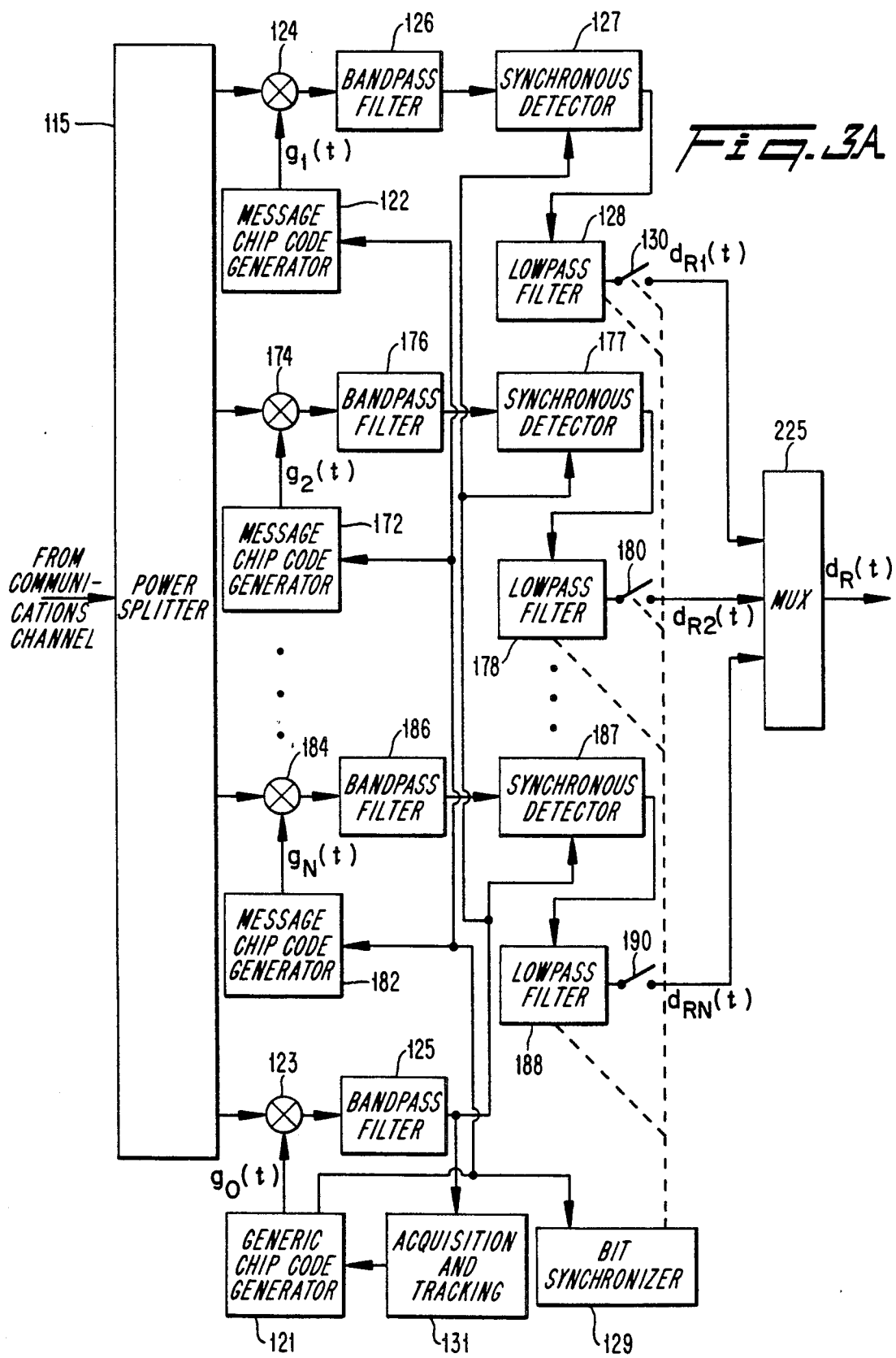
FIG. 3A shows a high-capacity-spread-spectrum receiver using a synchronous detector.

The plurality message-spread-spectrum-processing means, as shown in FIGS. 3A and 3B, may be embodied as a plurality of message-chip-code generators, a plurality of message mixers and a plurality of message-bandpass filters. A message mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code-generator 172, through $N^{th}$ message-chip-code generator 182. The plurality of message mixers generate replicas of the plurality of message-chip-code signals, $g_1(t)$, $g_2(t)$, ..., $g_n(t)$, respectively. The plurality of message mixers is shown as first message mixer 124, second message mixer 174, through $N^{th}$ message mixer 184. The plurality of message-bandpass filters is shown as first message-bandpass filter 126, second message-bandpass filter 176 through $N^{th}$ message-bandpass filter 186. The plurality of message mixers mix the received spread-spectrum-communications signal with the replicas of the plurality of message-chip-code signals to generate the plurality of modulated-data-signals, respectively. The plurality of message-bandpass filters filter the plurality of modulated-data signals, respectively.

The plurality of detection means detects the plurality of modulated-data signals as a plurality of detected signals, respectively. The plurality of detection means may be synchronous or nonsynchronous, for converting the plurality of modulated-data signals to the plurality of detected signals. In the illustrative example of FIG. 3A, the plurality of detection means is embodied as a plurality of synchronous detectors which is shown as first synchronous detector 127, second synchronous detector 177, through $N^{th}$ synchronous detector 187. A synchronous detector is coupled to a respective message-bandpass filter. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_{R1}(t)$, $d_{R2}(t)$, ..., $d_{RN}(t)$.

As illustratively shown in FIG. 3B, the detection means alternatively may be embodied as a plurality of nonsynchronous detectors, such as envelope or square law detectors. The plurality of nonsynchronous detectors is shown as first nonsynchronous detector 39, second nonsynchronous detector 189 through $N^{th}$ nonsynchronous detector 199. Typically, the nonsynchronous detectors do not require the recovered-carrier signal. A nonsynchronous detector is coupled to a respective message-bandpass filter. At the outputs of the plurality of message-bandpass filters are the plurality of received data, $d_{R1}(t)$, $d_{R2}(t)$, ..., $d_{RN}(t)$.

The bit-synchronization means uses the replica of the generic-chip-code signal produced by the generic-chip-code generator 121 for synchronizing the "integrating and dumping" of th detected signal. The "integrated and dumped" detected signals are referred to as demodulated signals. The plurality of bit-synchronization means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180, through $N^{th}$ electronic switch 190.

The bit synchronizer 129 derives timing from the replica of the generic-chip-code signal, $g_0(t)$, or one of the modulated-data signals, and controls the timing of the integrating and dumping functions of the plurality lowpass filters and the plurality of electronic switches.

The multiplexer means multiplexes the plurality of demodulated signals from the plurality of bit-synchronization means as the received-message data. As shown in FIGS. 3A and 3B, the multiplexer means is embodied as multiplexer 225. The multiplexer 225 is coupled to the plurality of lowpass filters. The plurality of demodulated signals from the lowpass filters are multiplexed to reconstitute the originally transmitted message data as received-message data.

A second embodiment of the high-capacity-spread-spectrum receiver for simultaneously receiving a plurality of spread-spectrum channels includes generic-spread-spectrum-processing means, acquisition and tracking means, multiplexer means, demodulation means, and switching means, and a plurality of spread-spectrum receivers. The generic-spread-spectrum-processing means generates a replica of the generic-chip-code signal. The generic-spread-spectrum-processing means uses the replica of the generic-chip-code signal for recovering a carrier signal from a spread-spectrum channel of the received spread-spectrum-communications signal.

In FIG. 4, the generic-spread-spectrum-processing means is embodied as the receiver-generic-chip-code generator 121, the generic mixer 123 and the generic-bandpass filter 125. The generic mixer 123 is coupled between the receiver-generic-chip-code generator 2 and the generic-bandpass filter 125.

The acquisition and tracking means acquires and tracks the recovered carrier signal, and synchronizes the generic-spread-spectrum-processing means to the recovered carrier signal. The acquisition and tracking means is embodied as an acquisition and tracking circuit 131. The acquisition and tracking circuit 131 is coupled to an output of the generic-bandpass filter 125, and to the receiver-generic-chip-code generator 121.

Each of the plurality of spread-spectrum receivers has message-spread-spectrum-processing means. Each of the message-spread-spectrum-processing means despreads the respective spread-spectrum channel of the received spread-spectrum-communications signal as a modulated-data signal. The first message-spread-spectrum-processing means is embodied as a first receiver-message-chip-code generator 122, a first message mixer 124 and a first message-bandpass filter 126. The first message mixer 124 is coupled between the first receiver-message-chip-code generator 122 and the first message-bandpass filter 126. The $N^{th}$ message-spread-spectrum-processing means is embodied as an $N^{th}$ receiver-message-chip-code generator 182, an $N^{th}$ message mixer 184 and an $N^{th}$ message-bandpass filter 186. The $N^{th}$ message mixer 84 is coupled between the $N^{th}$ receiver-message-chip-code generator 182 and the $N^{th}$ message-bandpass filter 186. The first receiver-message-chip-code generator 182 through $N^{th}$ receiver-message-chip-code generator preferably are coupled to the first receiver-generic-chip-code generator 121. A power splitter 115 is coupled between the communications channel 110, the generic mixer 123, and the first message mixer 124 through $N^{th}$ message mixer 184.

The plurality of message mixers generate replicas of the plurality of message-chip-code signals, $g_1(t), g_2(t), \ldots, g_n(t)$, respectively. The plurality of message mixers mix the received spread-spectrum-communications signal with the replicas of the plurality of message-chip-code signals to generate the plurality of modulated-data-signals, respectively. The plurality of message-bandpass filters filter the plurality of modulated-data signals, respectively.

A single demodulating means is employed for demodulating each modulated-data signal as a respective demodulated signal. Switching means is coupled between an input of the demodulation means and each output of the message-spread-spectrum-processing means. The switching means also is coupled between the output of the demodulation means and a plurality of inputs of the multiplexer means. The switching means switches the demodulation means between each of the message-spread-spectrum-processing means and each input of the multiplexer means, respectively. A single demodulation means accordingly demodulates, by time sharing, each of the modulated-data signals as a respective demodulated signal, from each of the message-spread-spectrum-processing means.

The demodulation means is embodied as a data demodulator 338. The data demodulator 338 includes a data detector and low pass filter. The data detector may be a nonsynchronous detector such as an envelope detector or a square-law detector. Alternatively, the detector may be a synchronous detector, which uses a recovered-carrier signal from the generic-bandpass filter 125.

The switching means is shown as input-electronic switch 330 and output-electronic switch 350. The input-electronic switch 330 and the output-electronic switch 350 are synchronized to switch the data demodulator 338 between respective message-bandpass filters and inputs to the multiplexer 225. Synchronization of the input-electronic switch 330 and the output-electronic switch 350 can be provided through a command channel of the received spread-spectrum communications signal, or other protocol.

The bit-synchronization means includes bit means, a lowpass filter 128 and electronic switch 130. The bit means is embodied as a bit synchronizer 129. The lowpass filter 128 and electronic switch 130 are coupled to the bit synchronizer 129. The bit synchronizer 129, as shown in FIG. 4, preferably is coupled to the receiver-generic-chip-code generator 121. Alternatively, the bit synchronizer 129 may be coupled to an output of the detector 139.

The multiplexer means, by time-sharing the demodulation means, combines each of the demodulated signals from the demodulation means to generate the received-message data. In FIG. 4, the multiplexer means is embodied as a multiplexer 225.

With the use of the invention as embodied in FIGS. 3A, 3B, and 4, a generic-spread-spectrum channel, as part of the received spread-spectrum-communications signal, provides a recovered-carrier signal. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generic-chip-code signal, $g_0(t)$, which provides timing to bit synchronizer 129 and to the plurality of receiver-message-chip-code generators.

The receiver-generic-chip-code generator 121 generates a replica of the generic-chip-code signal, $g_0(t)$. The generic mixer 123 uses the replica of the generic-chip-code signal for despreading the spread-spectrum-communications signal, $x_c(t)$, from the power splitter 115, as a recovered-carrier signal. The spread-spectrum channel of the received spread-spectrum-communications signal having the generic chip-code signal, $g_0(t)\cos w_0 t$, generally does not include data so that despreading the received spread-spectrum-communications signal produces the carrier signal, only. The generic-bandpass filter 125 filters the recovered-carrier signal at the carrier frequency, or equivalently, at an intermediate frequency (IF). In comparison to a message-bandpass filter which has a bandwidth sufficiently wide for filtering a modulated data signal, the generic-bandpass filter 125 can have a very narrow bandwidth for filtering the recovered carrier signal. The very narrow bandwidth of the generic-bandpass filter 125 assists in extracting the recovered carrier signal from noise.

The recovered-carrier signal is used to synchronize the step of generating a replica of the generic chip-code signal. More particularly, a replica of the generic-chip-code signal is correlated with the received spread-spectrum-communications signal, which has a generic channel defined by the generic-chip-code signal at the transmitter. If the signal out of the generic-bandpass filter is small, then the acquisition and tracking circuit 13 delays the phase of the replica of the generic-chip-code signal and the correlation process is repeated. If the phases of the replica of the generic-chip-code signal and the generic-chip-code signal in the received spread-spectrum-communications signal are the same, then the output of the generic-bandpass filter 125 is at a high voltage level.

In use, the demultiplexer 99 of FIG. 2 demultiplexes message data, d(t), into a plurality of demultiplexed-data signals, $d_1(t), d_2(t), \ldots, d_N(t)$. The transmitter-generic-chip-code generator 101 generates a generic-chip-code code signal, $g_0(t)$, and the plurality of transmitter-message-chip-code generators 102, 172, 182 generates a plurality of message-chip-code signals, $g_1(t), g_2(t), \ldots, g_N(t)$. Synchronous timing of the plurality of demultiplexed-data signals and the plurality of message-chip-code signals is provided by the generic-chip-code signal, although other sources can be used such as a common clock signal for synchronization. The plurality of EXCLUSIVE-OR devices 103, 173, 183 generates a plurality of spread-spectrum signals by spread-spectrum processing the plurality of demultiplexed-data signals with the plurality of message-chip-code signals, respectively. The spread-spectrum processing may be accomplished by modulo-2 adding the demultiplexed-data signal to the message-chip-code signal. The combiner 105 combines the generic-chip-code signal with the plurality of spread-spectrum-processed signals. The combined generic-chip-code signal and plurality of spread-spectrum-processed signals may be a multilevel signal, having the instantaneous voltage levels of the generic-chip-code signal and the spread-spectrum-processed signal.

The modulator 107, as part of the transmitter, modulates the combined generic-chip-code signal and the plurality of spread-spectrum-processed signals by a carrier signal, $\cos w_0 t$, at a carrier frequency, $f_0$. The modulated generic-chip-code signal and spread-spectrum processed signal are transmitted over the communications channel 110 as a spread-spectrum-communications signal, $x_c(t)$. Thus, the spread-spectrum-communications signal includes the generic-chip-code signal and the plurality of spread-spectrum-processed signals as if they were each modulated separately, and synchronously, on separate carrier signals having the same carrier frequency, $f_0$, and transmitted over the communications channel.

At a receiver, the generic-spread-spectrum-processing means recovers the carrier signal, $\cos w_0 t$, from the received spread-spectrum-communications signal, $x_c(t)$, and the plurality of message-spread-spectrum-processing means despreads the received spread-spectrum-communications signal, $x_c(t)$, as a plurality of modulated-data signals, $d_{R1}(t), d_{R2}(t), \ldots, d_{RN}(t)$, respectively. More particularly, referring to FIGS. 3A and 3B the received spread-spectrum-communications signal received from the communications channel 110, is divided by power splitter 115. The receiver-generic-chip-code generator 121 generates a replica of the generic-chip-code signal, $g_0(t)$. The generic mixer 123 uses the replica of the generic-chip-code signal for despreading the received spread-spectrum-communications signal, $x_c(t)$, from the power splitter 115, as a recovered-carrier signal. The spread-spectrum channel of the received spread-spectrum-communications signal having the generic-chip-code signal, $g_0(t)\cos w_0 t$, generally does not include data so that despreading the spread-spectrum-communications signal produces the carrier signal, only. The generic-bandpass filter 125 filters the recovered-carrier signal at the carrier frequency, or equivalently, at an IF. In comparison to the message-bandpass filter 126 which has a bandwidth sufficiently wide for filtering a modulated-data signal, the generic-bandpass filter 125 can have a very narrow bandwidth for filtering the recovered-carrier signal. The very narrow bandwidth of the generic-bandpass filter 125 assists in extracting the recovered-carrier signal from noise.

The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131.

The first receiver-message-chip-code generator 122 generates a replica of the first message-chip-code signal, $g_1(t)$. The replica of the first message-chip-code signal, $g_1(t)$, is synchronized to the replica of the generic-chip-code signal, $g_0(t)$, from the receiver-generic-chip-code generator 121. Thus, the first receiver-message-chip-code generator 122, via synchronization to the receiver-generic-chip-code generator 121, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation of the spread-spectrum channels with data.

The message mixer 124 uses the replica of the message-chip-code signal $g_1(t)$, for despreading the received spread-spectrum-communications signal, from the power splitter 115, to generate a modulated-data signal, $d_{R1}(t)\cos w_0 t$. The modulated-data signal effectively is the demultiplexed-data signal modulated by the carrier signal. The message-bandpass filter 126 filters the modulated-data signal at the carrier frequency, or equivalently at an intermediate frequency (IF). Down converters, which convert the modulated-data signal to an IF, optionally may be used without altering the cooperative functions o teachings of the present invention.

More generally, the plurality of message mixers generate replicas of the plurality of message-chip-code signals, $g_1(t), g_2(t), \ldots, g_n(t)$, respectively. The plurality of message mixers mix the received spread-spectrum-communications signal with the replicas of the plurality of message-chip-code signals to generate the plurality of modulated-data-signals, respectively. The plurality of message-bandpass filters filter the plurality of modulated-data signals, respectively.

The first detector 139 demodulates the modulated-data signal as a detected signal. The detected signal is filtered through first lowpass filter 128, sampled by electronic switch 130 and outputted as a first demodulated signal, $d_{R1}(t)$. The first demodulated signal, without errors, are identical to the first demultiplexed-data signal. The lowpass filter 128 and electronic switch 130 operate as an "integrate and dump" function, respectively, under the control of the bit synchronizer 129.

The bit synchronizer 129 controls the integrating and dumping of lowpass filter 128 and electronic switch 130. The bit synchronizer 129 preferably derives synchronization using the replica of the generic-chip-code signal from the receiver-generic-chip-code generator 121 as illustrated in FIG. 2. The bit synchronizer 129 also may derive synchronization from an output of the detector 139, as illustrated in FIG. 1, when a generic-chip-code signal is not used.

In a preferred embodiment, the bit synchronizer 129 receives the replica of the generic-chip-code signal, $g_0(t)$, from the receiver-generic-chip-code generator 121. The replica of the generic-chip-code signal, by way of example, may include a chip codeword having 8250 chips. Assuming that there are eleven bits per chip codeword, then there are 750 chips per bit of data. Since the replica of the generic-chip-code signal provides information to the bit synchronizer 129 as to where the chip codeword begins, the bit synchronizer 129 thereby knows the timing of the corresponding bits for synchronization.

The plurality of demodulated signals are multiplexed by multiplexer 225 to generate the received-message data. The received-message data are the wideband message data originally inputted to the high-capacity spread-spectrum transmitter.

The bit-synchronization means, embodied as the synchronous detector 127 synchronized to the recovered-carrier signal, demodulates the modulated-data signal as received data. The received data are integrated and dumped by lowpass filter 128 and electronic switch 130, respectively under control of the bit synchronizer 129. The bit synchronizer 129 preferably uses the replica of the generic-chip-code signal for synchronizing the integrate and dump functions.

The present invention further may include transmitting as the spread-spectrum-communications signal, a plurality of spread-spectrum-processed signals for handling a plurality of demultiplexed-data signals. In this case the invention uses a plurality of message means and a plurality of spreading means. The method includes the steps, as shown of FIG. 5, of demultiplexing 405 message data as plurality of demultiplexed-data signals, generating 403 a generic-chip-code signal generating 407 a plurality message-chip-code signals and spread-spectrum processing 408 each of the demultiplexed-data signals with each of the message-chip-code signals to generate a plurality of spread-spectrum-processed signals respectively. Each of the demultiplexed-data signals and the respective message-chip-code signal are synchronized to the generic-chip-code signal. The method also includes combining 409 the generic-chip-code signal with the plurality of spread-spectrum-processed signals, and transmitting 411 the combined generic-chip-code signal and the plurality of spread-spectrum-processed signals on a carrier signal over the communications channel as a spread-spectrum-communications signal.

The present invention also includes a method for synchronously demodulating a received spread-spectrum-communications signal. At a receiver, the method includes recovering 413 the carrier signal from the received spread-spectrum-communications signal and despreading 415 the received spread-spectrum-communications signal as a plurality of modulated-data signal. The recovered-carrier signal is used to synchronize the step of despreading the received spread-spectrum-communications signal and to demodulate 417 and multiplex 419 the plurality of demodulated signals as received-message data.

The receiving method also may have the demodulating step include synchronously demodulating, using the recovered-carrier signal, the modulated-data signal as a detected signal, or using an envelope detector, converting the modulated-data signal to the detected signal.

It will be apparent to those skilled in the art that various modifications can be made to the high-capacity spread spectrum system and method of the instant invention without departing from the scope or spirit of the invention, and it is intended that the present invention cover modifications and variations of the high-capacity spread spectrum system and method provided they come in the scope of the appended claims and their equivalents.

I claim:

1. A high-capacity-spread-spectrum transmitter, handling at least spread-spectrum-signals for use with a communications channel, comprising:

demultiplexer means for demultiplexing message data into a plurality of demultiplexed-data signals;

generic means for generating a generic-chip-code signal;

a plurality of message means for generating a plurality of message-chip-code signals, wherein each message-chip-code signal is orthogonal to the other message-chip-code signals of plurality of message-chip-code signals, and is synchronized to the generic-chip-code signal;

a plurality of spreading means coupled to said demultiplexer means and said plurality of message means, respectively, for spread-spectrum processing the plurality of demultiplexed-data signals with the plurality of message-chip-code signals to generate a plurality of spread-spectrum-processed signals, respectively;

summer means for combining the generic-chip-code signal with the plurality of spread-spectrum-processed signals;

transmitter means for transmitting the combined generic-chip-code signal and plurality of spread-spectrum-processed signals, on a carrier signal over said communications channel as a spread-spectrum-communications signal.

2. The high-capacity-spread-spectrum transmitter as set forth in claim 1, wherein:

said demultiplexer means includes a demultiplexer for demultiplexing message data into a plurality of demultiplexed-data signals;

said generic means includes a transmitter-generic-chip-code generator for generating the generic-chip-code signal;

each of said message means includes a transmitter-message-chip-code generator synchronized to the generic-chip-code signal, for generating the message-chip-code signal;

each of said spreading means includes an EXCLUSIVE-OR gate for spread-spectrum processing the plurality of demultiplexed-data signals with the message-chip-code signal; and said summer means includes a combiner for combining the plurality of generic-chip-code signals and the plurality of spread-spectrum-processed signals.

3. A high-capacity-spread-spectrum receiver, handling at least 17 spread-spectrum-processed signals, for simultaneously receiving a plurality of spread-spectrum channels of a received spread-spectrum-communications signal comprising:

a plurality of spread-spectrum receivers using a plurality of orthogonal message-chip-code signals, respectively, each of said spread-spectrum receivers including message-spread-spectrum-processing means using one of the orthogonal-message-chip-code signals for despreading the received spread-spectrum-communications signal as one of a plurality of modulated-data signals, and demodulation means for demodulating one of the modulated-data signals as one of a plurality of demodulated signals, respectively; and multiplexer means for multiplexing the plurality of demodulated signals from said plurality of spread-spectrum receivers as received-message data.

4. The high-capacity-spread-spectrum receiver as set forth in claim 3 further including:
generic-spread-spectrum-processing means for generating a replica of a generic-chip-code signal for recovering a carrier signal from a spread-spectrum channel, from the received spread-spectrum-communications signal; and
acquisition means responsive to acquiring and tracking the recovered carrier signal for synchronizing said generic-spread-spectrum-processing means to the recovered carrier signal.

5. The spread spectrum receiver as set forth in claim 4 wherein
said generic-spread-spectrum-processing means includes a generic mixer for recovering the carrier signal from the received spread-spectrum-communications signal;
each of said message-spread-spectrum-processing means includes a message mixer for despreading the received spread-spectrum-communications signal as one of the plurality of modulated-data signals;
each of said demodulation means includes an envelope detector for detecting one of the plurality of modulated-data signals as one of the plurality of demodulated signals, respectively; and
said multiplexer means includes a multiplexer for multiplexing each of the plurality of demodulated signals as the received-message data.

6. The spread spectrum receiver as set forth in claim 4 wherein
said generic-spread-spectrum-processing means includes a generic mixer for recovering the carrier signal from the received spread-spectrum-communications signal;
each of said message-spread-spectrum-processing means includes a message mixer for despreading the received spread-spectrum-communications signal as one of the plurality of modulated-data signals;
each of said demodulation means includes a synchronous detector responsive to the recovered-carrier signal for converting one of the plurality of modulated-data signals to one of the plurality of detected signals, respectively;
said multiplexer means includes a multiplexer for multiplexing each of the plurality of demodulated signals as the received-message data.

7. A high-capacity-spread-spectrum receiver, handling at least 17 spread-spectrum-processed signals, for simultaneously receiving a plurality of spread-spectrum channels of a received spread-spectrum-communications signal comprising:
a plurality of spread-spectrum receivers, using a plurality of orthogonal message-chip-code signals, respectively, each of said spread-spectrum receivers including message-spread-spectrum-processing means using one of the orthogonal message-chip-code signals for despreading the respective spread-spectrum channel of the received spread-spectrum-communications signal as a modulated-data signal;
demodulation means for demodulating each of the plurality of modulated-data signals as one of the plurality of demodulated signals, respectively;

multiplexer means having a plurality of inputs for multiplexing a plurality of demodulated signals; and
switching means coupled between an input of said demodulation means and each of said message-spread-spectrum-processing means and between an output of said demodulation means and the plurality of inputs of said multiplexer means, for switching said demodulation means between each of said message-spread-spectrum-processing means and each input of said multiplexer means, respectively.

8. The high-capacity-spread-spectrum receiver as set forth in claim 7 further including:
generic-spread-spectrum-processing means for generating a replica of the generic-chip-code signal for recovering a carrier signal from a spread-spectrum channel from the received spread-spectrum-communications signal; and
acquisition means responsive to acquiring and tracking the recovered carrier signal for synchronizing said generic-spread-spectrum-processing means to the recovered carrier signal.

9. The spread spectrum receiver as set forth in claim 8 wherein
said generic-spread-spectrum-processing means includes a generic mixer for recovering the carrier signal from the received spread-spectrum-communications signal;
each of said message-spread-spectrum-processing means includes a message mixer for despreading the received spread-spectrum-communications signal as one of the plurality of modulated-data signals;
each of said demodulation means includes an envelope detector for detecting one of the plurality of modulated-data signals as one of the plurality of demodulated signals, respectively; and
said multiplexer means includes a multiplexer for multiplexing each of the plurality of demodulated signals as the received-message data.

10. The spread spectrum receiver as set forth in claim 8 wherein
said generic-spread-spectrum-processing means includes a generic mixer for recovering the carrier signal from the received spread-spectrum-communications signal;
each of said message-spread-spectrum-processing means includes a message mixer for despreading the received spread-spectrum-communications signal as one of the plurality of modulated-data signals;
each of said demodulation means includes a synchronous detector responsive to the recovered-carrier signal for converting one of the plurality of modulated-data signals to one of the plurality of detected signals, respectively;
said multiplexer means includes a multiplexer for multiplexing each of the plurality of demodulated signals as the received-message data.

11. A high-capacity-spread-spectrum transmitter, handling at least 17 spread-spectrum-processed signals, for use with a communications channel, comprising:
a demultiplexer for demultiplexing message data into a plurality of demultiplexed-data signals;
a plurality of transmitter message-chip-code generators for generating a plurality of orthogonal message-chip-code signals;

a plurality of EXCLUSIVE-OR gates coupled to said demultiplexer and to said plurality of message-chip-code generators, respectively, wherein each EXCLUSIVE-OR gate spread-spectrum processes one of the plurality of demultiplexed-data signals with a respective message-chip-code signal to generate one of a plurality of spread-spectrum-processed signals, respectively;

a combiner, coupled to said plurality of EXCLUSIVE-OR gates, for combining the plurality of spread-spectrum-processed signals;

a transmitter coupled to said combiner for transmitting the combined plurality of spread-spectrum-processed signals, on a carrier signal over said communications channel as a spread-spectrum-communications signal.

12. The high-capacity-spread-spectrum transmitter as set forth in claim 9 further including:

a transmitter-generic-chip-code generator for generating a generic-chip-code signal;

wherein said plurality of transmitter-message-chip-code generators is coupled to said transmitter-generic-chip-code generator with each message-chip-code signal synchronized to the generic-chip-code signal;

wherein said combiner, coupled to said generic-chip-code generator, for combining the generic-chip-code signal and the plurality of spread-spectrum-processed signals; and wherein the transmitter transmits the combined generic-chip-code signal on a carrier signal over said spread-spectrum-communications channel as the spread-spectrum-communications signal.

13. A high-capacity-spread-spectrum receiver, handling at least 17 spread-spectrum-processed signals, for simultaneously receiving a plurality of spread-spectrum channels of a received spread-spectrum-communications signal comprising:

a receiver-generic-chip-code generator for generating a replica of the generic-chip-code signal;

a plurality of spread-spectrum receivers, each of said spread-spectrum receivers including a receiver-message-chip-code generator for generating a message-chip-code signal, and a message mixer coupled to said receiver-message-chip-code generator and responsive to the message-chip-code signal for despreading the received spread-spectrum-communications signal as one of a plurality of modulated-data signals;

demodulation means for demodulating the plurality of modulated-data signals as a plurality of demodulated signals; and a multiplexer for multiplexing the plurality of demodulated signals from said plurality of spread-spectrum receivers as received-message data.

14. The high-capacity-spread-spectrum receiver as set forth in claim 13, further including:

a generic mixer coupled to said receiver-generic-chip-code generator and responsive to the replica of the generic-chip-code signal for recovering a carrier signal from a spread-spectrum channel, from the received spread-spectrum-communications signal; and an acquisition circuit coupled to said generic mixer and responsive to acquiring and tracking the recovered carrier signal, for synchronizing said generic-chip-code generator to the recovered carrier signal.

15. The spread spectrum receiver as set forth in claim 14 wherein each of said demodulation means includes an envelope detector for detecting the plurality of modulated-data signals as the plurality demodulated signals, respectively.

16. The spread spectrum receiver as set forth in claim 14 wherein each of said demodulation means includes a synchronous detector responsive to the recovered-carrier signal for converting the plurality of modulated-data signals to the plurality of detected signals, respectively.

17. A high-capacity-spread-spectrum receiver, handling at least 17 spread-spectrum-processed signals, for simultaneously listening to a plurality of spread-spectrum channels of a received spread-spectrum-communications signal comprising:

a plurality of spread-spectrum receivers, each of said spread-spectrum receivers including a receiver-message-chip-code generator for generating a message-chip-code signal, and a message mixer coupled to said message-chip-code generator and responsive to the message-chip-code signal for despreading the received spread-spectrum-communications signal as a modulated-data signal;

demodulation means for demodulating the plurality of modulated-data signals as a plurality of demodulated signals, respectively;

a multiplexer having a plurality of inputs for multiplexing the plurality of the demodulated signals; and a switching circuit coupled between an input of said demodulation means and each of said message mixers and between an output of said demodulation means and the plurality of inputs of said multiplexer, for switching said demodulation means between each of said message mixers and each input of said multiplexers, respectively.

18. The spread spectrum communications system as set forth in claim 17 wherein said demodulation means includes an envelope detector for detecting the plurality of modulated-data signals as the plurality of demodulated signals, respectively.

19. The spread spectrum communications system as set forth in claim 17 wherein said demodulation means includes a synchronous detector responsive to the recovered-carrier signal for converting the plurality of modulated-data signals to the plurality of detected signals, respectively.

20. The high-capacity-spread-spectrum receiver as set forth in claim 17 further including:

a receiver-generic-chip-code generator for generating a replica of the generic-chip-code signal;

a generic mixer coupled to said generic-chip-code generator and responsive to the generic-chip-code signal for recovering a carrier signal for a respective spread-spectrum channel from the received spread-spectrum-communications signal; and an acquisition circuit responsive to acquiring and tracking the recovered carrier signal for synchronizing said generic-chip-code generator means to the recovered carrier signal.

21. The spread spectrum communications system as set forth in claim 20 wherein said demodulation means includes an envelope detector for detecting the plurality of modulated-data signals as the plurality of demodulated signals, respectively.

22. The spread spectrum communications system as set forth in claim 20 wherein
said demodulation means includes a synchronous detector responsive to the recovered-carrier signal for converting the plurality of modulated-data signals to the plurality of detected signals, respectively.

23. A method for transmitting spread spectrum conference calls, and for handling at least 17 spread-spectrum-processed signals, comprising the steps of:
demultiplexing message data as a plurality of demultiplexed-data signals;
generating a plurality message-chip-code signals;
spread-spectrum processing the plurality of demultiplexed-data signals with the message-chip-code signals, respectively, to generate a plurality of spread-spectrum-processed signals, wherein the plurality of demultiplexed-data signals and the plurality of message-chip-code signals are synchronized to the generic-chip-code signal;
combining the plurality of spread-spectrum-processed signals; and
transmitting the combined plurality of spread-spectrum-processed signals on a carrier signal over said communications channel as a spread-spectrum-communications signal.

24. A method for simultaneously listening to a plurality of spread-spectrum channels of a spread-spectrum communications signal, and for handling at least 17 spread-spectrum-processed signals, comprising the steps of:
generating, for each spread-spectrum channel, a replica of the message-chip-code signal synchronized to the replica of the generic-chip-code signal;
despreading, for each spread-spectrum channel, using the replica of the message-chip-code signal, the spread-spectrum channel of the spread-spectrum-communications signal as a modulated-data signal;
demodulating, for each spread-spectrum channel, the modulated-data signal as a demodulated signal; and
multiplexing the plurality of demodulated signals from said plurality of spread-spectrum receivers as received-message data.

25. The method a set forth in claim 24 wherein the demodulating step includes synchronously demodulating, using the recovered-carrier signal, the modulated-data signal as a detected signal.

26. The spread spectrum communications system as set forth in claim 24 wherein the demodulating step includes demodulating, using an envelope detector, the modulated-data signal as a detected signal.

* * * * *